US009733982B2

United States Patent
Ohno et al.

(10) Patent No.: US 9,733,982 B2
(45) Date of Patent: Aug. 15, 2017

(54) INFORMATION PROCESSING DEVICE AND METHOD FOR ASSIGNING TASK

(71) Applicant: FUJITSU LIMITED, Kawasaki-shi, Kanagawa (JP)

(72) Inventors: Yasuyuki Ohno, Fuji (JP); Kaname Mita, Numazu (JP); Naoki Sueyasu, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 14/520,557

(22) Filed: Oct. 22, 2014

(65) Prior Publication Data

US 2015/0154054 A1 Jun. 4, 2015

(30) Foreign Application Priority Data

Nov. 29, 2013 (JP) ................................. 2013-248325

(51) Int. Cl.
*G06F 9/45* (2006.01)
*G06F 9/50* (2006.01)

(52) U.S. Cl.
CPC .............. *G06F 9/5016* (2013.01); *G06F 8/45* (2013.01); *G06F 8/456* (2013.01); *G06F 8/443* (2013.01); *G06F 8/4452* (2013.01)

(58) Field of Classification Search
CPC .......... G06F 8/456; G06F 8/45; G06F 9/5066; G06F 8/443; G06F 11/3466; G06F 2201/865; G06F 8/4452; G06F 8/44; G06F 8/445
See application file for complete search history.

(56) References Cited

U.S. PATENT DOCUMENTS 9,086,925 B2 * 7/2015 Li ........................... G06F 9/5044
2002/0198924 A1 12/2002 Akashi et al.
2007/0143759 A1 * 6/2007 Ozgur ................... G06F 9/5033
718/102
2007/0294512 A1 * 12/2007 Crutchfield ............. G06F 8/443
712/200
2007/0294663 A1 * 12/2007 McGuire ................... G06F 8/45
717/108

(Continued)

FOREIGN PATENT DOCUMENTS

JP 63-239553 10/1988
JP 11-134082 5/1999

(Continued)

OTHER PUBLICATIONS

Richard Myungon Yoo et al., "Locality-Aware Task Management on Many-Core Processors", Stanford University, May 2012, pp. 1-121; <http://csl.stanford.edu/~christos/publications/2012.richard_yoo.phd_thesis.pdf>.*
Qawasmeh et al., "OpenMP Task Scheduling Analysis via OpenMP Runtime API and Tool Visualization", May 2014 IPDPSW'14, IEEE, pp. 1049-1058; <http://ieeexplore.ieee.org/stamp/stamp.jsp?arnumber=6969496>.*
Ruffaldi et al., "SOMA: an OpenMP toolchain for multicore partitioning", SAC 2016, Apr. 2016, ACM, pp. 1231-1237; <http://dl.acm.org/citation.cfm?id=2851720&CFID=756630271&CFTOKEN=93748675>.*

(Continued)

*Primary Examiner* — Thuy Dao
*Assistant Examiner* — Ben C Wang
(74) *Attorney, Agent, or Firm* — Staas & Halsey LLP

(57) ABSTRACT

A computer calculates memory access rates for respective tasks on basis of hardware monitor information obtained by monitoring operating states of hardware during execution of an application program. The tasks correspond to respective syntax units specified in the application program. The computer assigns, on basis of the calculated memory access rates, a first task to a socket in a processor in response to an instruction for executing the first task.

7 Claims, 15 Drawing Sheets

(56) References Cited

U.S. PATENT DOCUMENTS

| | | | |
|---|---|---|---|
| 2008/0077928 A1 | 3/2008 | Matsuzaki et al. | |
| 2008/0235364 A1* | 9/2008 | Gorbatov | G06F 1/3203 709/224 |
| 2009/0165007 A1* | 6/2009 | Aghajanyan | G06F 9/4881 718/103 |
| 2011/0271265 A1* | 11/2011 | Drozdov | G06F 8/4452 717/160 |
| 2012/0210097 A1* | 8/2012 | Oishi | G06F 9/5066 712/17 |
| 2012/0246654 A1* | 9/2012 | Eichenberger | G06F 9/5066 718/102 |
| 2014/0165047 A1* | 6/2014 | Lethin | G06F 8/443 717/151 |
| 2014/0189663 A1* | 7/2014 | Guenthner | G06F 8/456 717/146 |
| 2014/0208331 A1* | 7/2014 | Li | G06F 9/5044 718/105 |
| 2014/0325520 A1* | 10/2014 | Bacchus | G06F 9/5016 718/104 |
| 2014/0380322 A1* | 12/2014 | Ailamaki | G06F 9/4843 718/102 |
| 2015/0066988 A1* | 3/2015 | Cadambi | G06F 7/36 707/797 |
| 2016/0291950 A1* | 10/2016 | Yatou | G06F 8/458 |

FOREIGN PATENT DOCUMENTS

| | | |
|---|---|---|
| JP | 2003-6175 | 1/2003 |
| JP | 2008-84009 | 4/2008 |
| WO | 2004/044745 A1 | 5/2004 |
| WO | 2010/093003 A1 | 8/2010 |

OTHER PUBLICATIONS

Qawasmeh et al., "Open Source Task Profiling by Extending the OpenMP Runtime API", IWOMP Jun. 2012, LNCS 8122, Springer-Verlag Berlin Heidelberg, pp. 186-199; <https://link.springer.com/chapter/10.1007/978-3-642-40698-0_14>.*

Stephen L. Olivier et al., "Scheduling Task Parallelism on Multi-Socket Multicore Systems.", In Proceedings of the 1st International Workshop on Runtime and Operating Systems for Supercomputers (ROSS '11), 2011.

Notification of Reasons for Refusal for Japanese Application No. 2013-248325 dated Jun. 6, 2017.

* cited by examiner

FIG. 6

```
  ⋮
void traverse(struct node *p )
{
  if (p->left)
  #pragma omp task
      traverse(p->left);
  if (p->right)
  #pragma omp task
      traverse(p->right);
  #pragma omp taskwait
  process(p);
}
  ⋮
```

| TASK NAME (LEVEL) | THREAD NUMBER | ELAPSED TIME (s) | MEMORY ACCESS LATENCY (s) | TASK TYPE |
|---|---|---|---|---|
| task_A (0) | 0 | 15.00 | 3.00 | A00 |
| | 1 | 15.00 | 7.50 | A01 |
| task_A (1) | 0 | 20.00 | 4.00 | A10 |
| | 1 | 20.00 | 1.00 | A11 |

FIG. 9B TASK-SPECIFIC PROFILE INFORMATION

| TASK | LEVEL | MEMORY ACCESS RATE |
|---|---|---|
| A00 | 0 | 20% |
| A01 | 0 | 50% |
| A10 | 1 | 20% |
| A11 | 1 | 5% |

FIG. 9D TASK ASSIGNMENT STATUS

| SOCKET | CORE | TASK | LEVEL | MEMORY ACCESS RATE |
|---|---|---|---|---|
| #0 | #0 | A00 | 0 | 20% |
| #0 | #1 | A01 | 0 | 50% |
| #0 | #2 | A10 | 1 | 20% |
| #0 | #3 | A11 | 1 | 5% |
| #1 | #0 | | | |
| #1 | #1 | | | |
| #1 | #2 | | | |
| #1 | #3 | | | |

| TASK NAME (LEVEL) | THREAD NUMBER | ELAPSED TIME (s) | MEMORY ACCESS LATENCY (s) | TASK TYPE |
|---|---|---|---|---|
| task_B (0) | 0 | 15.00 | 3.00 | B00 |
| | 1 | 15.00 | 7.50 | B01 |
| task_C (0) | 0 | 20.00 | 4.00 | C10 |
| | 1 | 20.00 | 1.00 | C01 |

TASK-SPECIFIC PROFILE INFORMATION

| TASK | LEVEL | MEMORY ACCESS RATE |
|---|---|---|
| B00 | 0 | 20% |
| B01 | 0 | 50% |
| C00 | 0 | 20% |
| C01 | 0 | 5% |

TASK ASSIGNMENT STATUS

| SOCKET | CORE | TASK | LEVEL | MEMORY ACCESS RATE |
|---|---|---|---|---|
| #0 | #0 | B00 | 0 | 20% |
| #0 | #1 | C00 | 0 | 20% |
| #0 | #2 | C01 | 0 | 5% |
| #0 | #3 | | | |
| #1 | #0 | B01 | 0 | 50% |
| #1 | #1 | | | |
| #1 | #2 | | | |
| #1 | #3 | | | |

FIG. 11A

| TASK NAME (LEVEL) | THREAD NUMBER | ELAPSED TIME (s) | MEMORY ACCESS LATENCY (s) | TASK TYPE |
|---|---|---|---|---|
| task_B (0) | 0 | 15.00 | 3.00 | B00 |
| | 1 | 15.00 | 7.50 | B01 |
| task_C (0) | 0 | 20.00 | 4.00 | C00 |
| | 1 | 20.00 | 1.00 | C01 |

FIG. 11B

| TASK NAME (LEVEL) | THREAD NUMBER | ELAPSED TIME (s) | MEMORY ACCESS LATENCY (s) | TASK TYPE |
|---|---|---|---|---|
| task_B (0) | 0 | 10.00 | 2.00 | B00 |
| | 1 | 10.00 | 1.00 | B01 |
| task_C (0) | 0 | 15.00 | 6.00 | C00 |
| | 1 | 15.00 | 9.00 | C01 |

FIG. 12A

TASK ASSIGNMENT STATUS

| SOCKET | CORE | TASK | LEVEL | MEMORY ACCESS RATE |
|---|---|---|---|---|
| #0 | #0 | | | |
| #0 | #1 | | | |
| #0 | #2 | | | |
| #0 | #3 | | | |
| #1 | #0 | | | |
| #1 | #1 | | | |
| #1 | #2 | | | |
| #1 | #3 | | | |

FIG. 12B

PAST TASK-SPECIFIC PROFILE INFORMATION

| TASK | LEVEL | MEMORY ACCESS RATE |
|---|---|---|
| B00 | 0 | 20% |
| B01 | 0 | 50% |
| C00 | 0 | 20% |
| C01 | 0 | 5% |

FIG. 12C

TASK ASSIGNMENT STATUS

| SOCKET | CORE | TASK | LEVEL | MEMORY ACCESS RATE |
|---|---|---|---|---|
| #0 | #0 | B00 | 0 | 20% |
| #0 | #1 | C00 | 0 | 20% |
| #0 | #2 | C01 | 0 | 5% |
| #0 | #3 | | | |
| #1 | #0 | B01 | 0 | 50% |
| #1 | #1 | | | |
| #1 | #2 | | | |
| #1 | #3 | | | |

FIG. 12D

TASK ASSIGNMENT STATUS

| SOCKET | CORE | TASK | LEVEL | MEMORY ACCESS RATE |
|---|---|---|---|---|
| #0 | #0 | | | |
| #0 | #1 | | | |
| #0 | #2 | | | |
| #0 | #3 | | | |
| #1 | #0 | | | |
| #1 | #1 | | | |
| #1 | #2 | | | |
| #1 | #3 | | | |

FIG. 12E

PAST TASK-SPECIFIC PROFILE INFORMATION

| TASK | LEVEL | MEMORY ACCESS RATE |
|---|---|---|
| B00 | 0 | 20% |
| B01 | 0 | 10% |
| C00 | 0 | 40% |
| C01 | 0 | 60% |

FIG. 12F

TASK ASSIGNMENT STATUS

| SOCKET | CORE | TASK | LEVEL | MEMORY ACCESS RATE |
|---|---|---|---|---|
| #0 | #0 | B00 | 0 | 20% |
| #0 | #1 | B01 | 0 | 10% |
| #0 | #2 | C00 | 0 | 40% |
| #0 | #3 | | | |
| #1 | #0 | C01 | 0 | 60% |
| #1 | #1 | | | |
| #1 | #2 | | | |
| #1 | #3 | | | |

FIG. 14A

TASK ASSIGNMENT STATUS

| SOCKET | CORE | TASK | LEVEL | MEMORY ACCESS RATE |
|---|---|---|---|---|
| #0 | #0 | X | 0 | 30% |
| #0 | #1 |  |  |  |
| #0 | #2 |  |  |  |
| #0 | #3 | Y | 0 | 10% |
| #1 | #0 |  |  |  |
| #1 | #1 |  |  |  |
| #1 | #2 |  |  |  |
| #1 | #3 | Z | 0 | 40% |

FIG. 14B

PAST TASK-SPECIFIC PROFILE INFORMATION

| TASK | LEVEL | MEMORY ACCESS RATE |
|---|---|---|
| B00 | 0 | 20% |
| B01 | 0 | 50% |
| C00 | 0 | 20% |
| C01 | 0 | 5% |

FIG. 14C

TASK ASSIGNMENT STATUS

| SOCKET | CORE | TASK | LEVEL | MEMORY ACCESS RATE |
|---|---|---|---|---|
| #0 | #0 | X | 0 | 30% |
| #0 | #1 | B00 | 0 | 20% |
| #0 | #2 | C00 | 0 | 20% |
| #0 | #3 | Y | 0 | 10% |
| #1 | #0 | B01 | 0 | 50% |
| #1 | #1 | C01 | 0 | 5% |
| #1 | #2 |  |  |  |
| #1 | #3 | Z | 0 | 40% |

FIG. 14D

TASK ASSIGNMENT STATUS

| SOCKET | CORE | TASK | LEVEL | MEMORY ACCESS RATE |
|---|---|---|---|---|
| #0 | #0 | U | 0 | 20% |
| #0 | #1 |  |  |  |
| #0 | #2 |  |  |  |
| #0 | #3 |  |  |  |
| #1 | #0 | V | 0 | 10% |
| #1 | #1 | W | 0 | 5% |
| #1 | #2 |  |  |  |
| #1 | #3 |  |  |  |

FIG. 14E

PAST TASK-SPECIFIC PROFILE INFORMATION

| TASK | LEVEL | MEMORY ACCESS RATE |
|---|---|---|
| B00 | 0 | 20% |
| B01 | 0 | 10% |
| C00 | 0 | 40% |
| C01 | 0 | 60% |

FIG. 14F

TASK ASSIGNMENT STATUS

| SOCKET | CORE | TASK | LEVEL | MEMORY ACCESS RATE |
|---|---|---|---|---|
| #0 | #0 | U | 0 | 20% |
| #0 | #1 | B00 | 0 | 20% |
| #0 | #2 | C00 | 0 | 40% |
| #0 | #3 |  |  |  |
| #1 | #0 | V | 0 | 10% |
| #1 | #1 | W | 0 | 5% |
| #1 | #2 | B01 | 0 | 10% |
| #1 | #3 | C01 | 0 | 60% |

US 9,733,982 B2

INFORMATION PROCESSING DEVICE AND METHOD FOR ASSIGNING TASK

CROSS-REFERENCE TO RELATED APPLICATION

This application is based upon and claims the benefit of priority of the prior Japanese Patent Application No. 2013-248325, filed on Nov. 29, 2013, the entire contents of which are incorporated herein by reference.

FIELD

The embodiment discussed herein is related to an information processing device and a method for assigning a task.

BACKGROUND

Assignment to sockets and cores in processors has been able to be specified at most for each loop in syntax or for each subroutine in a program corresponding to an application that performs each process. Accordingly, for more detailed (finer-grained) syntax, the assignment has not been able to be specified at the application side and has been specified at the level of an operating system (OS). This limits improvement in processing efficiency and processing performance.

For example, the concept of tasks has been introduced into OpenMP (registered trademark), which is syntax of a thread parallel application for use for high performance computing (HPC) processors and so on. OpenMP allows the application side to select a plurality of sockets and cores.

Related techniques are disclosed in, for example, Japanese Laid-open Patent Publication No. 2003-6175 and Japanese Laid-open Patent Publication No. 2008-84009, and Stephen L. Olivier, Allan K. Porterfield, Kyle B. Wheeler, and Jan F. Prins, "Scheduling task parallelism on multi-socket multicore systems", in *Proceedings of the 1st International Workshop on Runtime and Operating Systems for Supercomputers (ROSS '11)*, 2011.

Since the concept of tasks has been introduced as described above, in application programs, assignment to sockets and cores for each syntax unit may be performed using information inside the application. This enables improvement in processing efficiency and processing performance.

However, in the case of a conventional algorithm such as simple first-in first-out or round robin scheme, or the like, consideration is not taken for memory access in each task, for example. Influence of such an issue limits improvement in processing efficiency and processing performance.

SUMMARY

According to an aspect of the present invention, provided is a computer-readable recording medium having stored therein a task assignment program for causing a computer to execute a process. In the process, the computer calculates memory access rates for respective tasks on basis of hardware monitor information obtained by monitoring operating states of hardware during execution of an application program. The tasks correspond to respective syntax units specified in the application program. The computer assigns, on basis of the calculated memory access rates, a first task to a socket in a processor in response to an instruction for executing the first task.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of syntax included in an application program for executing tasks;

FIGS. 9A to 9D are diagrams illustrating an example of assignment to sockets and cores on the basis of memory access rates;

FIGS. 11A and 11B are diagrams illustrating a first example of assignment;

FIGS. 12A to 12F are diagrams illustrating a first example of assignment;

FIGS. 14A to 14F are diagrams illustrating a second example of assignment; and

DESCRIPTION OF EMBODIMENT

Hereinafter, an embodiment will be described in detail with reference to the accompanying drawings.

Figure 1:
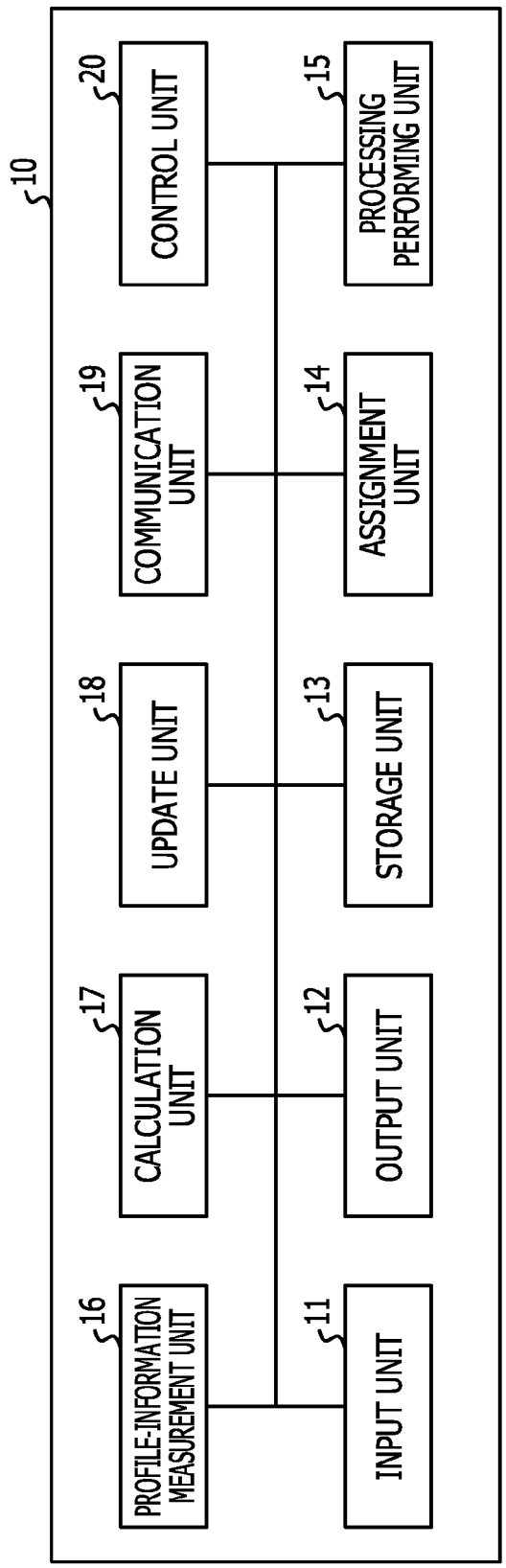
FIG. 1 is a diagram illustrating an exemplary functional configuration of an information processing device.

FIG. 1 is a diagram illustrating an exemplary functional configuration of an information processing device. An information processing device 10 illustrated in FIG. 1 assigns tasks corresponding to a predetermined application, for example, to sockets, cores, and so on of a processor so as to perform parallel processing. The information processing device 10 illustrated in the example of FIG. 1 includes an input unit 11, an output unit 12, a storage unit 13, an assignment unit 14, a processing performing unit 15, a profile-information measurement unit 16, a calculation unit 17, an update unit 18, a communication unit 19, and a control unit 20.

The input unit 11 accepts various inputs, such as inputs of start and completion of various instructions and inputs of settings, from a user and so on. For example, the input unit 11 accepts instructions according to the present embodiment, such as instructions for assignment of tasks to sockets and cores, instructions for performing processing, instructions for measuring profile information, instructions for calculation, instructions for updating, and instructions for communication. The input unit 11 may be, for example, a keyboard or a mouse, may also be, for example, in a touch-panel form using a screen, and may also be a microphone or the like, but is not limited to this.

The output unit 12 outputs content input via the input unit 11, content performed based on the input content, and so on. For example, the output unit 12 may be a display unit, such as a display or a monitor, when performing output through screen display, and may be a sound output unit, such as a speaker, when performing output in sound, but is not limited to this.

The storage unit 13 stores therein various types of information to be used in the present embodiment. For example, the storage unit 13 stores therein information on each instruction obtained from the input unit 11, one or more tasks set so as to correspond to each of various types of applications, the content of assignment of tasks to sockets and cores, hardware monitor information, profile information, and so on. The information stored in the storage unit 13 is not limited to the information mentioned above.

The storage unit 13 reads and writes various types of stored information at predetermined timings as appropriate. The storage unit 13 is, for example, a hard disk or a memory, but is not limited to this. The storage unit 13 may be provided as a storage device (disk device) connected in a state where data may be transmitted and received through the communication unit 19.

The assignment unit 14 acquires information regarding the degree (memory access rate) of memory access for every task from the past profile information, and performs assignment of each task to sockets, cores, and so on. Note that a task is, for example, a block enclosed by the task syntax of an application program (source code) using OpenMP. Accordingly, each task corresponds to, for example, each syntax unit for a task, but is not limited to this.

Based on, for example, a memory access rate, the assignment unit 14 performs assignment to sockets and cores of a processor for each syntax unit for a task in a program for implementing an application, in response to a task instruction from the application. The assignment unit 14 may also perform task assignment on the basis of profile information updated by the update unit 18. Assignment of tasks may be performed at a timing at which the profile information is updated (for example, completion of execution of each loop or each subroutine). However, assignment of tasks is not limited to this, and may be performed, for example, at a timing of execution of each application.

The processing performing unit 15 performs processing (such as parallel processing) of the tasks assigned to cores and sockets in the processor by the assignment unit 14. The processing performing unit 15 executes an executable file or the like that corresponds to an application programmed using a syntax unit for a task defined, for example, by OpenMP Application Program Interface (API) Version 3.0 to perform task processing specified in the program.

The profile-information measurement unit 16 measures task-specific profile information using hardware monitor information obtained when the processing performing unit 15 performs processing. The hardware monitor information is, for example, information obtained by monitoring operating states of hardware during execution of an application. As the hardware monitor information, information regarding each task, each loop, each subroutine, each application, and so on may be output; however, the output information is not limited to this.

Examples of measured information of hardware monitor information include, but are not limited to, an "elapsed time", "million floating-point operations per second (MFLOPS)", "MFLOPS peak performance ratio", "million instructions per second (MIPS)", "MIPS peak performance ratio", "memory access throughput (for each chip)", "memory access throughput peak performance ratio (for each chip)", and "single instruction multiple data (SIMD) instruction percentage". For example, hardware monitor information may include memory access latency, cache miss information, and so on.

"Elapsed time" is a period of time used for execution of an instruction for a task or the like, for example, in an elapsed time measurement range. "MFLOPS" is, for example, floating-point arithmetic performance (the average number of performing floating-point arithmetic operations in one second). "MFLOPS peak performance ratio" is, for example, a ratio of the actual measured value to the logical peak value of MFLOPS. "MIPS" is instruction performance (the average number of executing instructions in one second). "MIPS peak performance ratio" is a ratio of the actual measured value to the logical peak value of MIPS, for example.

"Memory access throughput (for each chip)" is an average data transfer amount per second between a memory and a central processing unit (CPU). "Memory access throughput peak performance ratio (for each chip)" is a ratio of the actual measured value to the logical peak value of memory access throughput (for each chip).

"SIMD instruction percentage" is, for example, a percentage of the number of SIMD instructions in the number of executed instructions. The SIMD instruction is, for example, an instruction for performing operations on a plurality of operands with a single instruction.

Note that, with the hardware monitor information, it is possible to verify the execution performance of a program. For example, the closer the MIPS value and the MFLOPS value are to their respective peak values, the higher the execution performance and the operation performance of the program are.

The calculation unit 17 calculates the memory access rate for each task on the basis of the aforementioned hardware monitor information and so on. A specific example of the calculation approach in the calculation unit 17 will be described later.

The update unit 18 updates task-specific profile information on the basis of a memory access rate calculated by the calculation unit 17 and so on. Thus, the assignment unit 14 may appropriately perform assignment to sockets and cores on the basis of a history of the memory access rates and so on of the tasks on the occasion when the tasks are being performed.

The communication unit 19 transmits and receives various types of information to and from an external device over a communication network, for example, represented by the Internet or a local area network (LAN). The communication unit 19 is capable of receiving various types of information and so on already stored in the external device and so on, and is also capable of transmitting a result of processing in the information processing device 10 over the communication network to the external device and so on.

The control unit 20 controls the entire configuration of the information processing device 10. In particular, the control unit 20 performs each control for a task assignment process, for example, on the basis of an instruction from the input unit 11 issued by the user or the like. Here, examples of each control include, but are not limited to, causing the assignment unit 14 to perform assignment of tasks to sockets and cores, causing the processing performing unit 15 to perform task processing, causing the profile-information measurement unit 16 to measure profile information, causing the calculation unit 17 to calculate a memory access rate, and causing the update unit 18 to update task-specific profile information. Note that each processing in the assignment unit 14, the processing performing unit 15, the profile-information measurement unit 16, the calculation unit 17, and the update unit 18 may be implemented by, for example, executing at least one application program set in advance.

According to the present embodiment, the aforementioned information processing device 10 may control in real time, for example, to which sockets and cores the tasks are to be assigned using profile information during performing the tasks. Accordingly, in parallel processing using an HPC processor or the like, improvement in processing efficiency and processing performance may be achieved.

The information processing device 10 is made up of, for example, a personal computer (PC), a server, and so on. However, the information processing device 10 is not limited to this and may be applied to, for example, a computer including a multiprocessor, such as an HPC processor.

Figure 2:
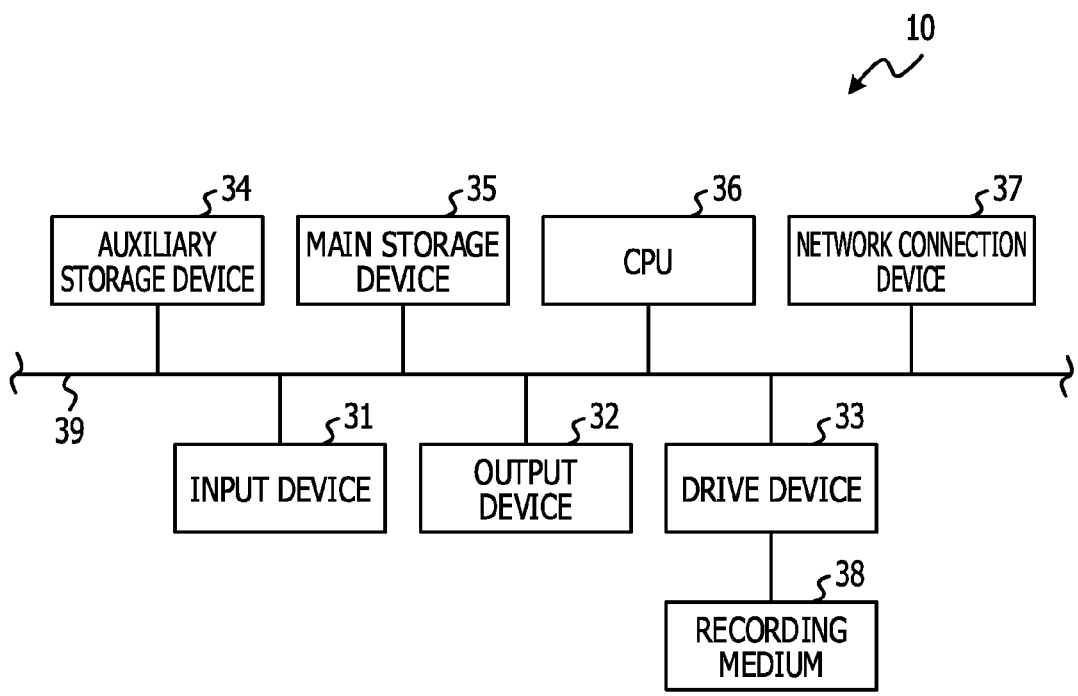
FIG. 2 is a diagram illustrating an exemplary hardware configuration of an information processing device.

FIG. 2 is a diagram illustrating an exemplary hardware configuration of the information processing device. The information processing device 10 illustrated in FIG. 2 includes an input device 31, an output device 32, a drive device 33, an auxiliary storage device 34, a main storage device 35, a CPU 36 that performs various types of control, and a network connection device 37, and these are mutually connected by a system bus 39.

The input device 31 includes a keyboard operated by a user or the like and a pointing device such as a mouse, and a voice input device such as a microphone, and accepts input of instructions for execution of a program issued by the user or the like, various types of operation information, information for launching software and so on.

The output device 32 includes a display or the like for displaying various windows, data, and so on to be used for operating the computer (the information processing device 10) for performing processing according to the present embodiment. The output device 32 is capable of displaying the progress of execution and results of an application program when the CPU 36 executes a control program.

According to the present embodiment, an execution program to be installed in the computer is provided by using a recording medium 38 or the like. The recording medium 38 may be set in the drive device 33. Based on a control signal from the CPU 36, the execution program stored in the recording medium 38 is installed in the auxiliary storage device 34 through the drive device 33 from the recording medium 38.

The auxiliary storage device 34 is, for example, a storage unit such as a hard disk drive (HDD) or a solid state drive (SSD). Based on a control signal from the CPU 36, the auxiliary storage device 34 stores therein an execution program (a task assignment program) according to the present embodiment, a control program provided in the computer, and so on, and performs inputting and outputting as appropriate. Based on control signals from the CPU 36, the auxiliary storage device 34 may write therein information to be used and read information from among stored information.

The main storage device 35 stores therein an execution program and so on read from the auxiliary storage device 34 by the CPU 36. The main storage device 35 is a random access memory (RAM), or the like.

By executing control programs such as an OS, and the execution program stored in the main storage device 35, the CPU 36 controls processing of the entire computer, such as various operations and input and output of data with hardware components, to implement each processing. Various types of information to be used during execution of programs may be acquired from the auxiliary storage device 34, and execution results and so on may also be stored in the auxiliary storage device 34. The CPU 36 includes a multiprocessor and performs parallel processing in which sockets and cores in the processor are specified for each syntax unit for a task using task instructions issued by an application or the like.

In particular, in response to an instruction obtained from the input device 31 to execute a program, for example, the CPU 36 executes, on the main storage device 35, the program installed in the auxiliary storage device 34 to perform processing corresponding to the program. For example, by executing a task assignment program, the CPU 36 performs the aforementioned processing, such as the assignment to sockets and cores performed by the assignment unit 14, execution of processing by the processing performing unit 15, the measurement of the profile information by the profile-information measurement unit 16, the calculation of a memory access rate by the calculation unit 17, and the update of profile information by the update unit 18. Content of processing by the CPU 36 is not limited to this. The result of execution by the CPU 36 is stored in the auxiliary storage device 34 as appropriate.

The network connection device 37 communicates with other external devices over the aforementioned communication network. The network connection device 37 is connected to the communication network or the like, on the basis of a control signal from the CPU 36, and thereby acquires an execution program, software, setting information, and so on from an external device and so on. The network connection device 37 may provide an execution result obtained by executing a program to an external device, and may also provide the execution program according to the present embodiment itself to an external device and so on.

The recording medium 38 is a computer-readable recording medium in which an execution program and so on are stored as described above. The recording medium 38 is, for example, a semiconductor memory such as a flash memory, or a portable recording medium such as a compact disk read-only memory (CD-ROM) or a digital versatile disk (DVD), but is not limited to this.

By installing an execution program (for example, a task assignment program and so on) in the hardware configuration illustrated in FIG. 2, hardware resources and software may cooperate. As a result, the task assignment process and so on according to the present embodiment may be implemented.

Figure 3:
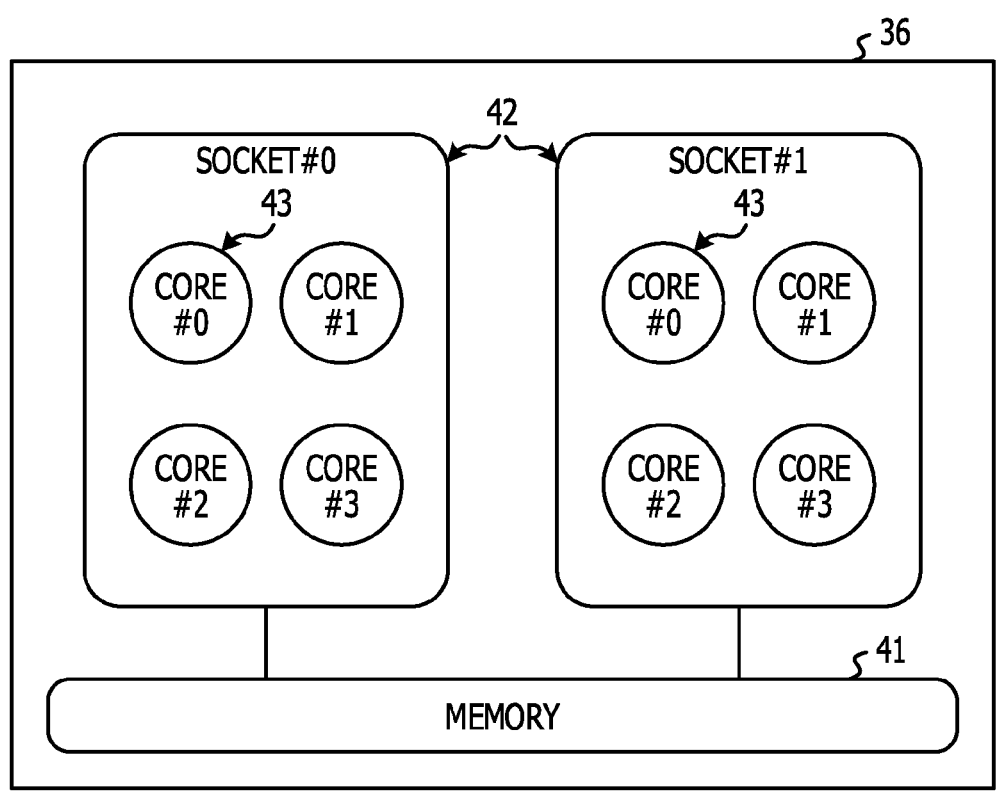
FIG. 3 is diagram illustrating a specific example of a CPU.

Next, a specific example of the CPU 36 according to the present embodiment will be described. FIG. 3 is diagram illustrating a specific example of the CPU. The CPU 36 illustrated in the example of FIG. 3 is a multi-core processor, and includes a plurality of cores in one processor package. For example, the CPU 36 includes a memory 41 and one or more sockets 42 (two sockets #0 and #1 in the example of FIG. 3). Each socket 42 is a package including one or more cores 43 (four cores #0 to #3 in the example of FIG. 3). The number of sockets and the number of cores are not limited to the numbers in the example of FIG. 3. The CPU 36 improves performance owing to parallel processing performed by the multi-core processor as illustrated in FIG. 3.

The memory 41 is a high-speed storage device (for example, a primary cache) provided inside a microprocessor.

Storing frequently used data in the memory 41 enables access to a low-speed main memory to be decreased, which, in turn, enables processing to be speeded up. For example, when the CPU 36 is equipped with a two-level cache memory, the CPU 36 first tries to read data from the primary cache, which operates at a higher speed and has a smaller capacity, and, if the data is not found in the primary cache, then tries to read the data from the secondary cache, which operates at a lower speed and has a larger capacity. Note that the main storage device 35 and the auxiliary storage device 34 described above may be used for the primary cache and the secondary cache of the memory 41.

The socket 42 is an area for storing a plurality of cores 43. In the case of tasks in a parent-child relationship, for example, the tasks are arranged in the same socket in order to maintain locality of the memory or the like. Thus, access terminates within one socket, and therefore processing efficiency and processing performance improve.

The core 43 is a part which performs operation processing of the computer. According to the present embodiment, for example, one task is assigned to one core 43 for each syntax unit.

Figure 4:
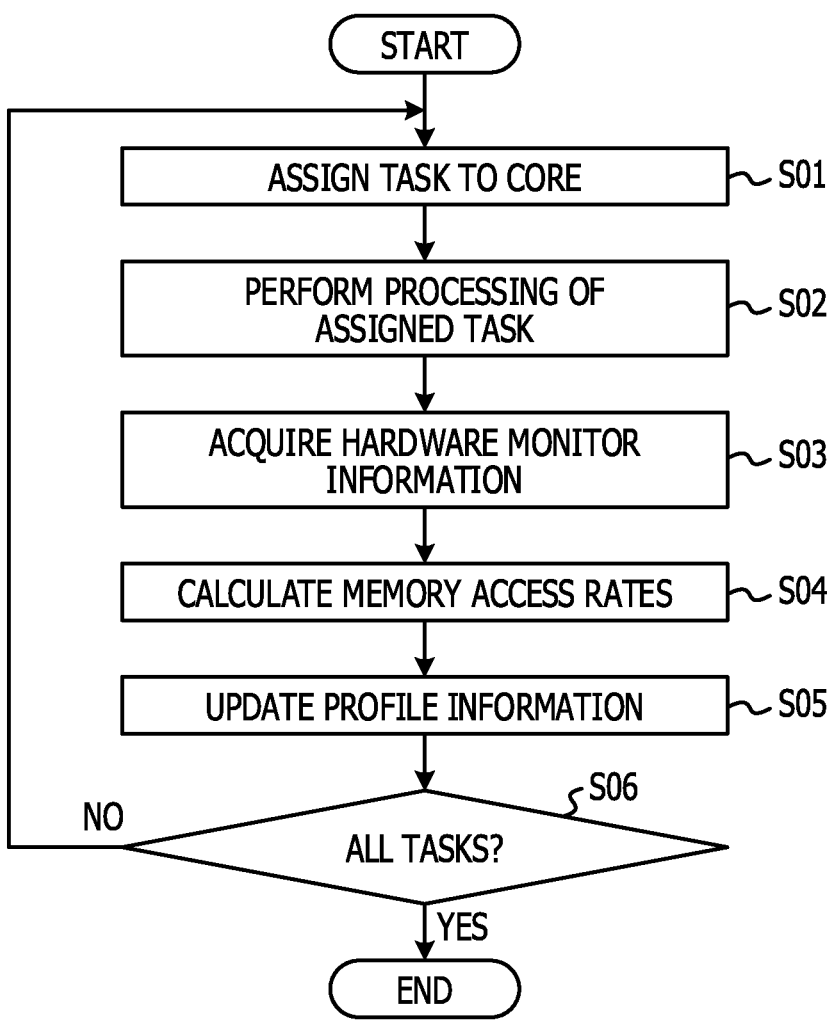
FIG. 4 is a flowchart illustrating an exemplary process of an information processing device.

Next, an exemplary process (task assignment process) in the information processing device 10 according to the present embodiment will be described with reference to a flowchart. FIG. 4 is a flowchart illustrating an exemplary process of the information processing device.

In the example of FIG. 4, the assignment unit 14 of the information processing device 10 assigns a task, which is to be executed in accordance with a task instruction in an application program, to a core (S01). In processing of S01, the assignment unit 14 acquires the degree of memory access or the like for every task, using the past task-specific profile information, and, on the basis of the result, assigns a task to a core for each syntax unit. Note that, in the processing of S01, for example, in the case where there are a plurality of sockets as illustrated in FIG. 3, assignment may be made so as to determine what socket is to be used.

Next, the processing performing unit 15 of the information processing device 10 performs processing of the task assigned to the core (S02). The profile-information measurement unit 16 of the information processing device 10 acquires hardware monitor information during execution of the task (S03), and calculates the memory access rate for the task on the basis of the acquired hardware monitor information (S04).

Next, the update unit 18 of the information processing device 10 updates task-specific profile information on the basis of the memory access rate for the task calculated in S04 (S05).

Next, the information processing device 10 determines whether processing of all the tasks included in the application program (S06), and returns to S01 if the processing of some tasks has not been completed (NO in S06). In this case, in the next processing of S01, assignment of each task to a core is performed using the task-specific profile information updated in processing of S05. If processing of all the tasks has been completed (YES in S06), the information processing device 10 completes the process.

Figure 5:
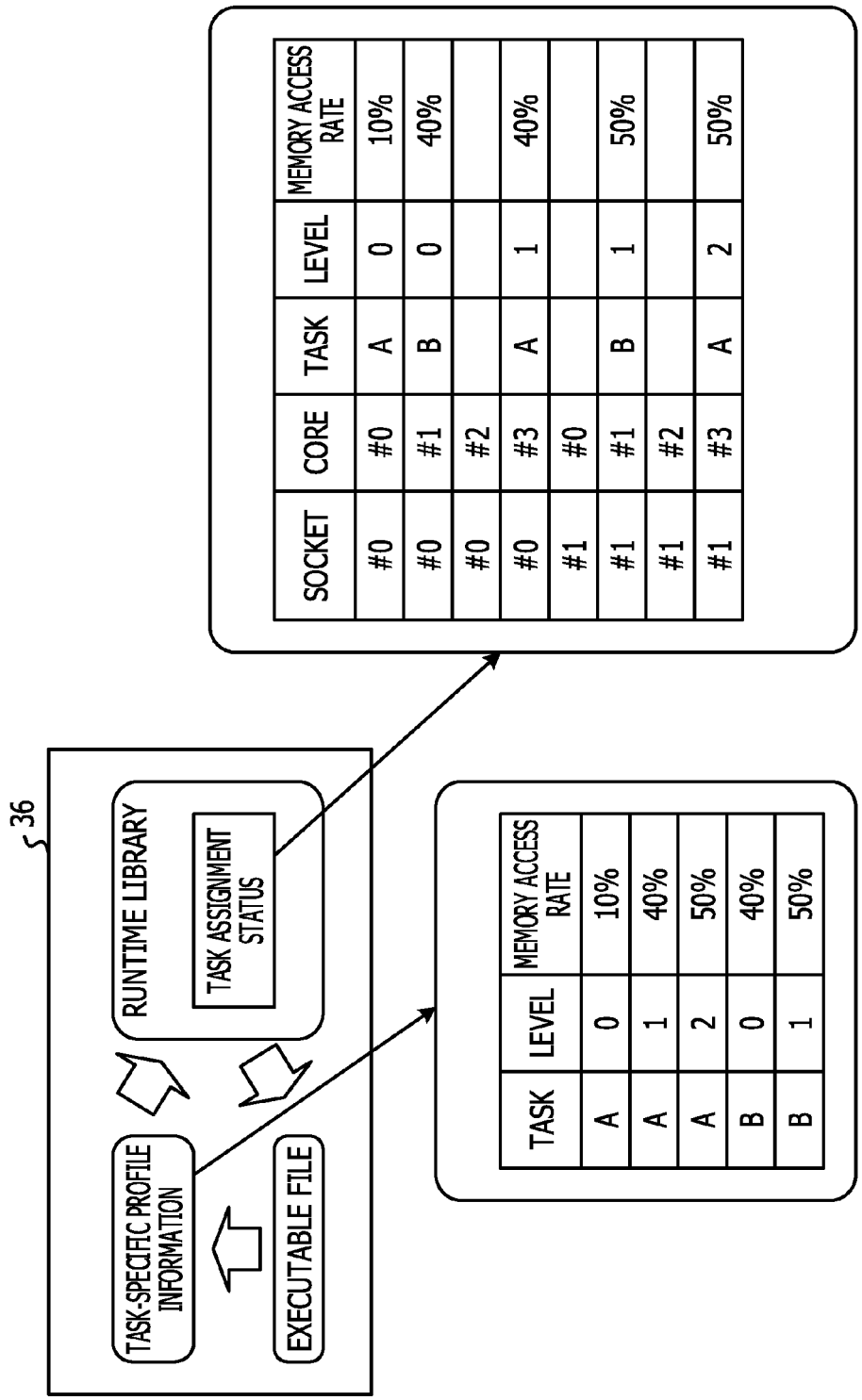
FIG. 5 is a diagram illustrating a specific example of a task assignment approach according to an embodiment.

A specific example of the task assignment according to the present embodiment will be described. FIG. 5 illustrates a specific example of a task assignment approach according to the present embodiment. In the example of FIG. 5, the CPU 36, which is an example of a multi-core processor as illustrated in FIG. 3, executes an executable file corresponding to a predetermined application. When performing assignment of a task to a core for each syntax unit, the CPU 36 acquires task-specific profile information.

Examples of items of the task-specific profile information depicted in the example of FIG. 5 include, but are not limited to, "task", "level", and "memory access rate". "Task" is information for identifying a task. "Level" is information indicating one the levels of hierarchy (for example, parent-child relationship) of tasks. For example, the example of FIG. 5 illustrates that a task A is classified into three levels "0", "1", and "2". "Memory access rate" is a memory access rate measured by task and by level.

The CPU 36 acquires a status of assignment of a task being performed to a socket and a core, using software components (modules) to be used when a computer program included in a runtime library or the like is executed. Examples of items of the task assignment status include, but are not limited to, "socket", "core", "task", "level", and "memory access rate". "Socket" is information for identifying a socket in the CPU 36. "Core" is information for identifying a core in each socket. The example of FIG. 5 illustrates that a socket #0 includes four cores #0 to #3. "Task" is information on a task assigned to each core of each socket. "Level" indicates one the levels of hierarchy of tasks. "Memory access rate" indicates a result of calculating a memory access rate of a task by using the calculation unit 17 on the basis of the acquired task assignment statuses.

The CPU 36 newly performs assignment to sockets and cores for each syntax unit using the calculated memory access rates. Note that the syntax unit is, for example, a syntax unit for a task, but are not limited to this, and may be an application or a thread (processes performed in parallel).

According to the present embodiment, it is possible, on the application side, to calculate actual memory access rates and perform the next assignment to sockets and cores through task instructions on the basis of the calculated memory access rates.

Next, the task syntax according to the present embodiment will be described. For example, in conventional approaches, tasks are executed in such a way that tasks are assigned to suitable sockets, in a configuration of a processor (the CPU 36) as illustrated in FIG. 3, by a simple first-in first-out scheme, a round robin scheme, or the like at the OS-level. For this reason, improvement in processing efficiency and processing performance has had limitations in conventional approaches. To address this, according to the present embodiment, a task in OpenMP is divided into tasks at the level of nesting in syntax, and assigns the tasks to cores. Accordingly, assignment control may be performed, for example, using specification of operations at every nesting level of a task in OpenMP.

Figure 7B:
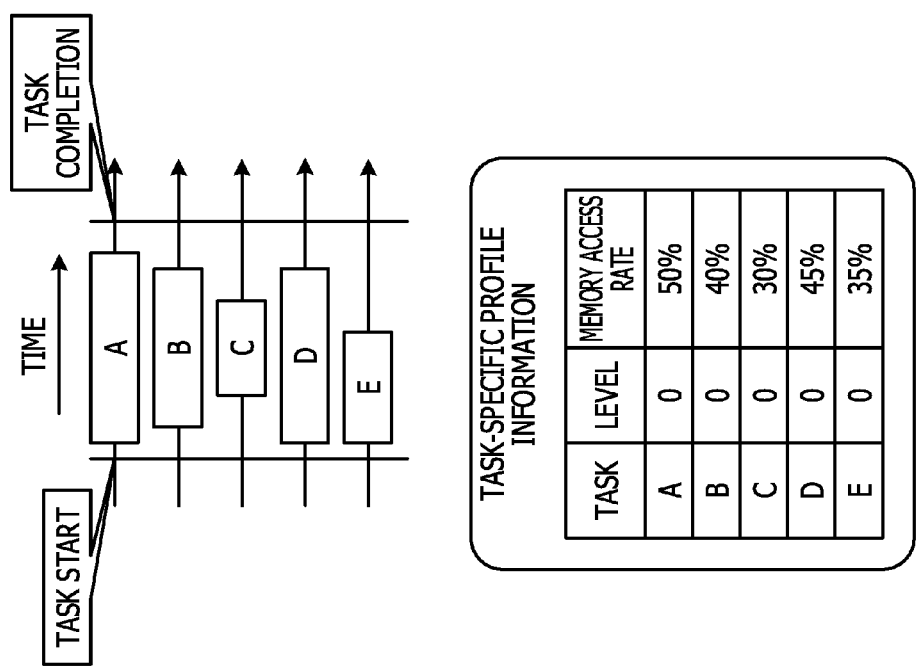
FIGS. 7A and 7B are diagrams illustrating an example of task assignment according to an embodiment.
Figure 7A:
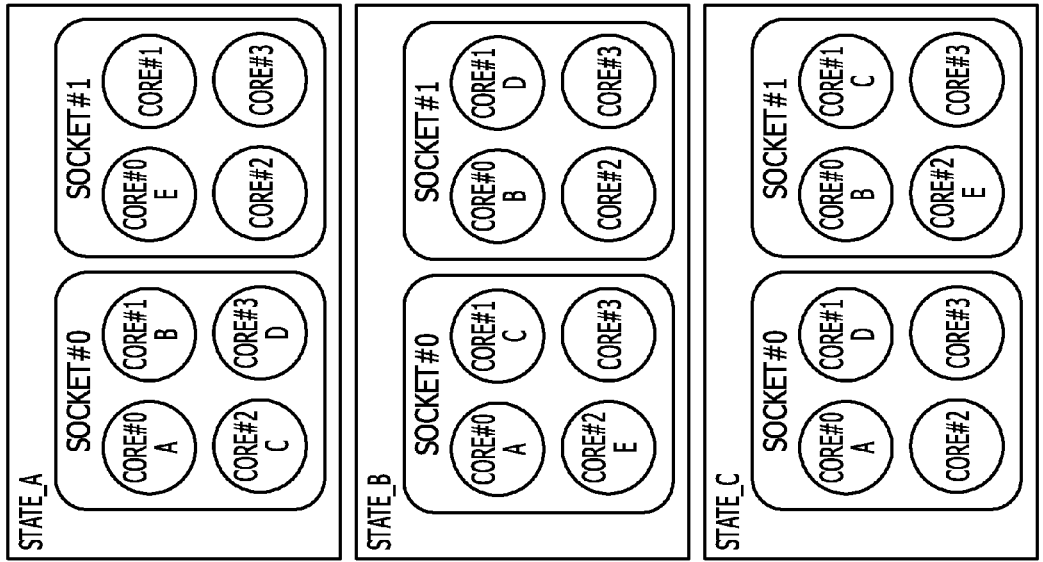

Here, FIG. 6 is a diagram illustrating an example of syntax included in an application program for executing tasks. FIG. 7A and FIG. 7B illustrate an example of task assignment according to the present embodiment.

The example of FIG. 6 depicts an exemplary syntax compliant with OpenMP API Version 3.0. When an application for executing tasks, in accordance with the program as depicted in FIG. 6, is run, the memory access rate of a task inside the traverse in the task syntax is not known with a conventional approach. Therefore, to what socket a task is to be assigned has been determined, irrespective of an instruction for the task inside the traverse, and tasks have been assigned to cores sequentially from the head core of the cores, or in a round robin manner.

For example, when there are five tasks A to E as illustrated in FIG. 7A, in a conventional assignment scheme, the tasks A to E have been assigned to cores sequentially from the head core (core #0) of a socket #0 as illustrated as STATE_A of FIG. 7B. In another conventional assignment method, as illustrated as STATE_B of FIG. 7B, tasks have been assigned in a round robin manner in order to make the loads as uniform as possible. Therefore, tasks have not been assigned to appropriated sockets.

To address this, according to the present embodiment, information on memory access rates and so on of the tasks A to E on the occasion when the tasks are being executed is managed in terms of history by utilizing hardware monitor information, so that task-specific profile information as illustrated in FIG. 7A is measured. Next, using this task-specific profile information, it is determined whether a task to be run is a task having a high memory access rate. Based on such information, each task is assigned to a socket and to a core as illustrated as STATE_C of FIG. 7B. Thus, improvement in processing efficiency and processing performance of a processor may be achieved.

Figure 8:
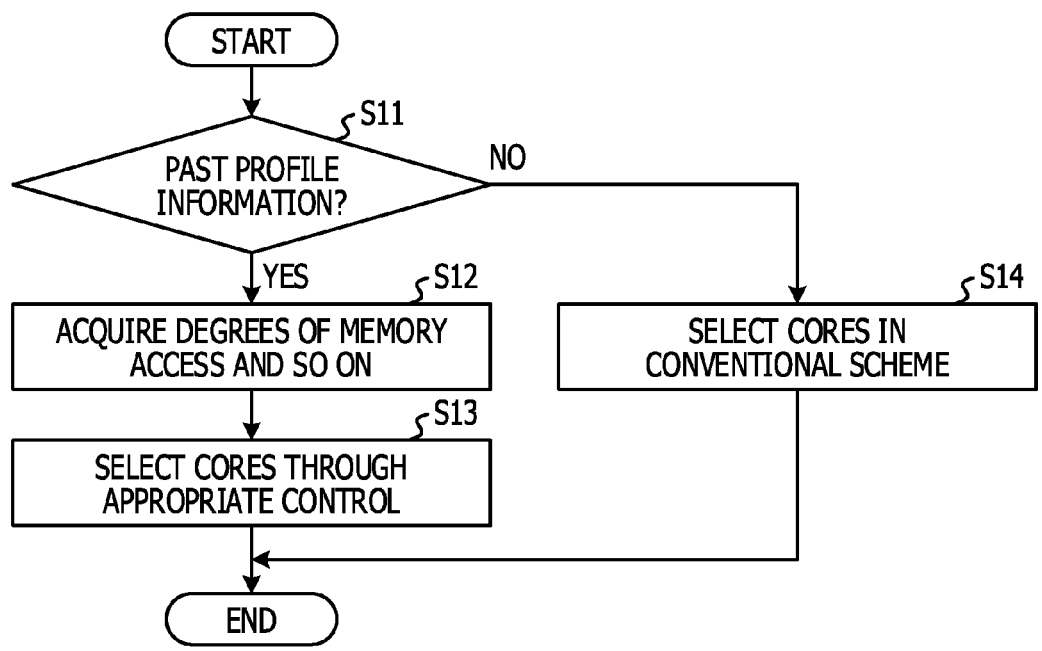
FIG. 8 is a flowchart illustrating an exemplary process in an assignment unit.

Next, an example of assignment of cores in the assignment unit 14 described above will be described with reference to a drawing. FIG. 8 is a flowchart illustrating an exemplary process in the assignment unit. In the example of FIG. 8, first, the assignment unit 14 determines whether there is past task-specific profile information (S11). Note that the past task-specific profile information is preferably, for example, task-specific profile information obtained from hardware monitor information for an application implemented by executing the same program (task group), but is not limited to this.

If it is determined that there is past task-specific profile information in S11 (YES in S11), the assignment unit 14 acquires the degrees (for example, the memory access rates) of memory access for tasks using the past profile information (S12). Next, the assignment unit 14 selects cores to which tasks are to be assigned through appropriate control (S13). Appropriate control is, for example, such that a task having a high memory access rate is assigned to a core of a socket in which there is a task having a low memory access rate, and a task having a low memory access rate is assigned to a core of a socket in which there is a task having a high memory access rate. That is, assignment is performed so that the degrees of memory access in all the sockets are made as uniform as possible. Note that the appropriate control is not limited to this, and, for example, processing such as assigning tasks in a parent-child relationship to one socket may be performed.

If it is determined that there is not past task-specific profile information (NO in S11), the assignment unit 14 selects cores to which tasks are to be assigned in a conventional scheme in which, for example, tasks are assigned to cores sequentially from the head core of the cores, or tasks are assigned in a round robin manner in order to make the loads as uniform as possible (S14).

Next, examples of assignment to sockets and cores on the basis of memory access rates according to the present embodiment will be described with reference to drawings. FIGS. 9A to 9D and FIGS. 10A to 10D illustrate examples of assignment to sockets and cores on the basis of memory access rates. Note that the example of FIGS. 9A to 9D illustrates the case where tasks to be executed are in a parent-child relationship, and the example of FIGS. 10A to 10D illustrates the case where tasks to be executed are not in a parent-child relationship. The parent-child relationship of tasks is, for example, the case where an execution result of a parent task (level "0") is utilized as input data in a child task (level "1"), but is not limited to this.

Figures 9A, 9C:
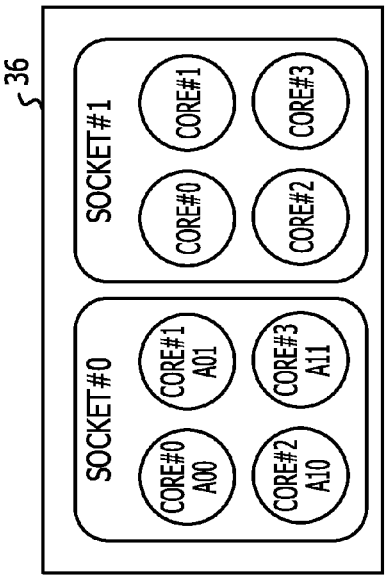

FIG. 9A illustrates an example of content of tasks executed in a two-thread parallel program (two levels) and hardware monitor information after execution of processing. FIG. 9B illustrates an example of task-specific profile information measured using the hardware monitor information of FIG. 9A. FIG. 9C illustrates an example in which tasks are assigned to sockets and cores of the CPU 36 so as to correspond to the task-specific profile information of FIG. 9B. FIG. 9D illustrates an example of a task assignment status.

Examples of items regarding the two-thread parallel program illustrated in FIG. 9A include, but are not limited to, "task name (level)", "thread number", "elapsed time (second)", "memory access latency (second)", and "task type". The "elapsed time" is a time elapsed for executing the task. The "memory access latency" is a time for waiting completion of an access to a memory in the task. The "task type" in FIG. 9A is named by "task name+level+thread number", for example, in order to distinguish tasks from one another, but is not limited to this.

In the example of FIG. 9A, the tasks (in task_A) to be executed are in a parent-child relationship (levels "0" and "1"). In such a case, when cores to which tasks are to be assigned are selected, the cores are arranged in the same socket in order to maintain the locality of a cache (the memory 41). Accordingly, as illustrated in FIG. 9C, tasks A00, A01, A10, and A11 are assigned to cores #0 to #3 of a socket #0, respectively.

Note that the memory access rate illustrated in FIG. 9B may be acquired using the memory access latency and the elapsed time illustrated in FIG. 9A such that "memory access rate (%)=memory access latency (second)/elapsed time (second)×100", but is not limited to this.

Figures 10A, 10B, 10C, 10D:
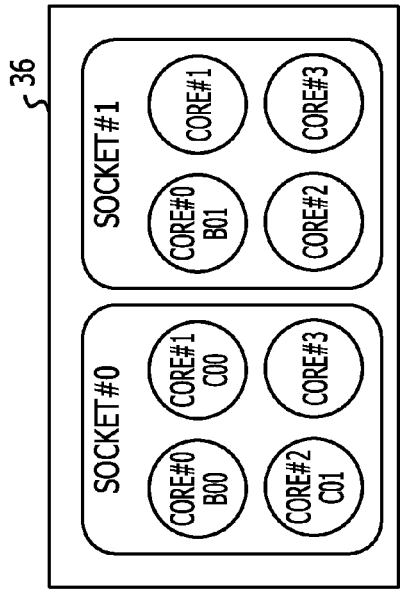
FIGS. 10A to 10D are diagrams illustrating an example of assignment to sockets and cores on the basis of memory access rates.
Figure 13B:
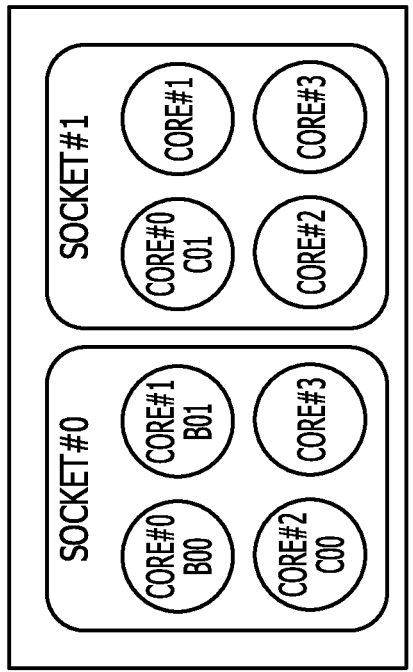
FIGS. 13A and 13B are diagrams illustrating a first example of assignment.
Figure 13A:
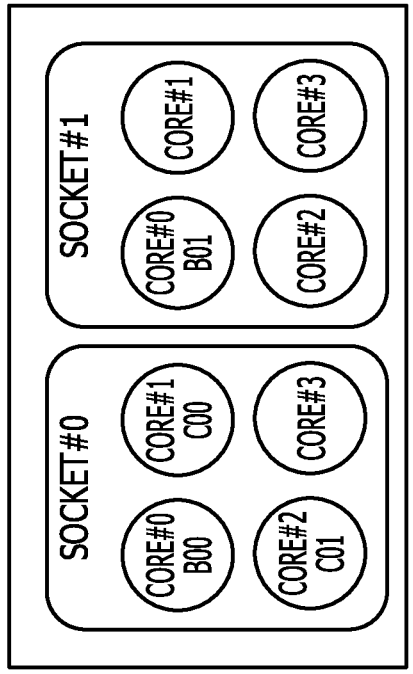

In contrast, in the example of FIGS. 10A to 10D, FIG. 10A illustrates an example of content of tasks executed in a two-thread parallel program (one level) and hardware monitor information after execution of processing. FIG. 10B illustrates an example of task-specific profile information measured using the hardware monitor information of FIG. 10A. FIG. 10C illustrates an example in which tasks are assigned to sockets and cores of the CPU 36 so as to correspond to the task-specific profile information of FIG. 10B. FIG. 10D illustrates an example of task assignment status.

In the example of FIG. 10A, the tasks (task_B and task_C) to be executed are not in a parent-child relationship. In such a case, when appropriate cores to which tasks are to be assigned are determined, assignment is performed using the memory access rates and task assignment status so that the memory access rates of all the sockets are made as uniform as possible. For example, the assignment unit 14 assigns a task having a high memory access rate to a socket in which there is a task having a low memory access rate, and assigns a task having a low memory access rate to a socket in which there is a task having a high memory access rate.

In the assignment illustrated in the example of FIG. 10C, tasks B00, C00, and C01 are assigned to the socket #0, and therefore the memory access rate of the socket #0 is 20+20+5=45% on the basis of the task-specific profile information. A task B01 is assigned to the socket #1, and therefore the memory access rate of the socket #1 is 50% on the basis of the task-specific profile information.

When the aforementioned assignment is performed, adjustment is preferably performed so that, for example, the total of memory access rates of tasks assigned within a socket does not exceed a predetermined value (for example, 80% to 100%), but adjustment is not limited to this.

In this way, according to the present embodiment, depending on whether a plurality of tasks to be executed are in a parent-child relationship, assignment of tasks to sockets and cores may be changed as illustrated in FIGS. 9A to 9D and FIGS. 10A to 10D. Thus, improvement in processing efficiency and processing performance may be achieved.

Next, content of processing from start to completion of task processing performed by the profile-information measurement unit 16 will be described. First, the assignment unit 14 assigns tasks to sockets and cores set in advance, through appropriate control in the aforementioned processing for selecting cores. Then, the processing performing unit 15 starts to perform processing of the task assigned to the cores for each task unit by the assignment unit 14. On this occasion, the profile-information measurement unit 16 also starts to measure profile information of tasks using hardware monitor information in order to update task-specific profile information. Note that, at the time of first execution of tasks, since task-specific profile information does not exist, assignment to cores is performed, for example, in a conventional scheme (such as a simple first-in first-out scheme, a round robin scheme, or the like). Which conventional scheme is to be used may be set, for example, in advance by a user or the like.

While processing is being performed, profile information and so on may be updated upon each completion of predetermined task syntax such as each loop, each subroutine, or the like, or at each predetermined interval. Measurement of profile information is also completed when task processing is completed.

Next, processing in the update unit 18 will be described. The update unit 18 updates task-specific profile information using the result of the aforementioned profile information measurement. For example, according to the present embodiment, assignment to sockets and cores may be controlled by each syntax units for a task during program execution.

For example, in a single application program, the same function (task) is repeatedly performed by loop processing, subroutine processing, or the like. For this reason, according to the present embodiment, task-specific profile information is acquired at all times by a profiler, so that assignment to sockets and cores in the next task processing is appropriately performed. For example, even when the same task is executed repeatedly, the content of processing varies each time and the load also varies each time, depending on, for example, behavior (for example, conditional branch by an IF-statement) defined in the program. However, as in the present embodiment, the case where the load varies may be handled by acquiring task-specific profile information at all times by a profiler and using the acquired information as a material for prediction of the next task assignment. In addition, according to the present embodiment, the tasks are assigned to appropriate sockets and cores by utilizing hardware monitor information during execution of tasks. This reduces the loads of execution of tasks, which, in turn, enables the task performance to be improved.

Next, examples of the next assignment of tasks to sockets and cores will be described with reference to drawings.

First Example of Assignment

FIGS. 11A and 11B, FIGS. 12A to 12F, and FIGS. 13A and 13B illustrate a first example of assignment. FIG. 11A illustrates an example of the content of tasks at the (N−1)-th task assignment and the hardware monitor information after processing is performed. FIG. 11B illustrates an example of the content of tasks at the N-th task assignment and the hardware monitor information after processing is performed.

The first example of assignment is an example of the case where tasks are executed in a two-thread parallel program (one level) and not in a parent-child relationship, and where execution is made in a state in which sockets and cores are occupied (cores are unused whenever tasks are to be assigned to).

In the first example of assignment, as illustrated in FIG. 12A, it is assumed that the total of memory access rates of all the sockets immediately before the N-th task assignment is 0% (unassigned) for the socket #0 and 0% (unassigned) for the socket #1.

Here, when an application program including tasks B00, B01, C00, and C01 is executed, tasks are assigned to respective cores. For this purpose, the assignment unit 14 acquires memory access rates with reference to the past task-specific profile information, for example, the statistical history of the first task assignment to the (N−1)-th task assignment, or historical information of only the (N−1)-th task assignment (FIG. 12B) acquired from the past hardware monitor information illustrated in FIG. 11A. The assignment unit 14 assigns tasks on the basis of the acquired memory access rates, as illustrated in FIG. 12C. In the example of FIG. 12C, assignment is performed so that the memory access rates are made as uniform as possible among all the sockets, and, thus, the total of the memory access rates is 45% for the socket #0, and 50% for the socket #1. Accordingly, processing is performed in accordance with assignment of tasks to sockets and cores illustrated in FIG. 13A. In the first example of assignment, the hardware monitor information is acquired while processing is being performed as illustrated in FIG. 11B, and the task-specific profile information is updated using the acquired hardware monitor information.

Next, in the first example of assignment, as illustrated in the example of FIG. 12D, it is assumed that the total of the memory access rates immediately before the (N+1)-th task assignment is 0% (unassigned) for the socket #0, and 0% (unassigned) for the socket #1.

Here, when the application program including tasks B00, B01, C00, and C01 is executed, the assignment unit 14 acquires memory access rates with reference to the updated task-specific profile information, for example, or the statistical history of the first task assignment to the N-th task assignment, or historical information of only the N-th task assignment (FIG. 12E). Based on the acquired memory access rates, the assignment unit 14 assigns tasks as illustrated in FIG. 12F. In the example of FIG. 12F, assignment is performed so that the memory access rates are made as uniform as possible among all the sockets, and, thus, the total of the memory access rates is 70% for the socket #0, and 60% for the socket #1. Accordingly, processing is performed in accordance with assignment of tasks to sockets and cores illustrated in FIG. 13B. In the first example of assignment, the task-specific profile information is updated using the hardware monitor information acquired while processing is being performed. Therefore, in the (N+2)-th and later task assignments, sockets and cores may be similarly specified for each syntax unit for a task using the updated task-specific profile information.

Second Example of Assignment

FIGS. 14A to 14F and FIGS. 15A and 15B illustrate a second example of assignment. The second example of assignment is the same as the first example of assignment in that the tasks are executed in a two-thread parallel program (one level) and not in a parent-child relationship. In the second example of assignment, the application program is executed using sockets and cores in common with another application program (for example, at the time of task assignment, another program is assigned to an arbitrary core). In the second example of assignment, it is assumed that an example of the aforementioned content of tasks and hardware monitor information after processing illustrated in FIGS. 11A and 11B is used, as in the first example of assignment.

In the second example of assignment, as illustrated in FIG. 14A, tasks X, Y, and Z other than the tasks to be executed exist in some of the cores. For this reason, the total of memory access rates immediately before the N-th task assignment is 40% for the socket #0 and 40% for the socket #1.

Here, when an application program including tasks B00, B01, C00, and C01 is executed, the assignment unit 14 acquires memory access rates with reference to the past task-specific profile information, for example, the statistical history of the first task assignment to the (N−1)-th task assignment, or historical information of only the (N−1)-th task assignment (FIG. 14B) in order to assign tasks to respective cores. The assignment unit 14 assigns tasks on the basis of the acquired memory access rates, as illustrated in FIG. 14C. In the example of FIG. 14C, assignment is performed so that the memory access rates are made as uniform as possible among all the sockets. In the example of FIG. 14C, tasks X, B00, C00, and Y are assigned to the socket #0, and all the cores #0 to #3 in the socket #0 are used, and therefore the task C01 is assigned to the socket #1. Accordingly, finally, the total of memory access rates is 80% for the socket #0, and 95% for the socket #1.

Figure 15B:
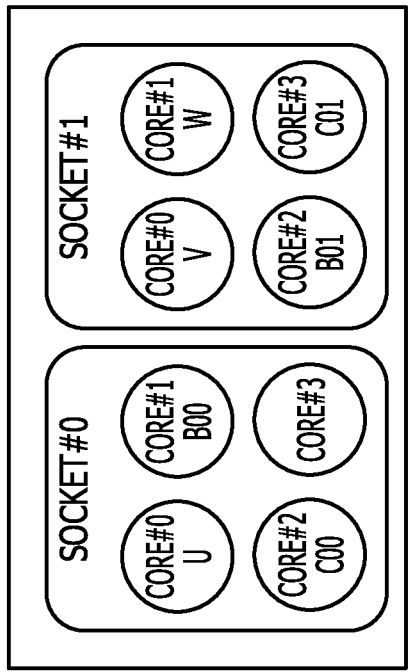
FIGS. 15A and 15B are diagrams illustrating a second example of assignment.
Figure 15A:
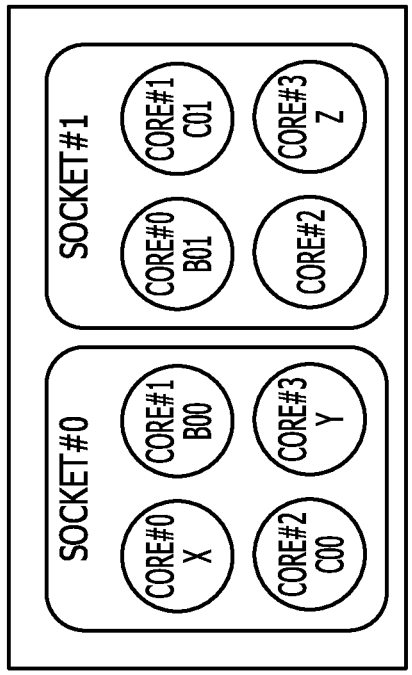

Accordingly, processing is performed in accordance with assignment of tasks to sockets and cores illustrated in FIG. 15A. In the second example of assignment, the hardware monitor information is acquired while processing is being performed, and the task-specific profile information is updated using the acquired hardware monitor information.

Next, in the second example of assignment, when the (N+1)-th assignment is performed, as illustrated in FIG. 14D, tasks U, V, and W other than the tasks to be executed exist in some of the cores. For this reason, the total of memory access rates immediately before the (N+1)-th task assignment is 20% for the socket #0 and 15% for the socket #1.

Here, when the application program including tasks B00, B01, C00, and C01 is executed, the assignment unit 14 acquires memory access rates with reference to the updated task-specific profile information, for example, the statistical history of the first task assignment to the N-th task assignment, or historical information of only the N-th task assignment (FIG. 14E). Based on the acquired memory access rates, the assignment unit 14 assigns tasks as illustrated in FIG. 14F. In the example of FIG. 14F, assignment is performed so that the memory access rates are made as uniform as possible among all the sockets, and, thus, the total of the memory access rates is 80% for the socket #0, and 85% for the socket #1. Accordingly, processing is performed in accordance with assignment of tasks to sockets and cores illustrated in FIG. 15B. In the second example of assignment, the task-specific profile information is updated using the hardware monitor information acquired while processing is being performed. Therefore, in the (N+2)-th and later task assignments, sockets and cores may be similarly specified for each syntax unit for a task using the updated task-specific profile information.

In this way, according to the present embodiment, feedback control may also be performed in real time for the next assignment, and appropriate handling may be performed using task-specific profile information.

In the aforementioned embodiment, the memory access rate is calculated using the memory access latency and the elapsed time of the hardware information; however, the memory access rate is not limited to this, and may be calculated, for example, based on the cache miss information and the elapsed time. Cache miss information may be collected from hardware monitor information. Cache miss indicates the case where data does not exist when the CPU 36 searches the cache memory (the memory 41). In the case where cache miss occurs, data to be used does not exist in the cache memory, which is in a short range, but exists in the main memory, which is in a long range. Therefore, it takes a long time to access the data. The time used for the access is memory access latency. Accordingly, if there are many cache misses, the memory access latency also increases. The memory access rate may therefore be calculated using a cache miss rate instead of the memory access latency described above. Accordingly, when there is much memory access and there are very many or few cache misses, sockets and cores to which tasks to be executed are assigned are changed according to the present embodiment. This may significantly improve the efficiency of task execution.

As described above, according to the present embodiment, based on actual memory access rates, sockets and cores may be specified for each syntax unit on the application side through task instructions. For this reason, improvement in processing efficiency and processing performance may be achieved.

According to the present embodiment, for example, an application program having task syntax, such as OpenMP, is executed, and, based on the history of memory access rates and so on of tasks on the occasion when the application program is being executed, sockets and cores to which tasks are to be assigned may be appropriately selected. History management of information, such as memory access rates of tasks on the occasion when the application program is being executed, is performed utilizing, for example, hardware monitor information, and, using such information, it is determined whether the task to be executed is a task having a high memory access rate. Based on information on the determination, it is possible to appropriately select sockets and cores to which tasks are to be assigned. According to the present embodiment, tasks may be assigned to sockets and cores in an appropriate load distribution on the basis of the memory access rates. The processing time per socket may therefore be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for assigning a task, the method comprising:
    calculating, by a computer, memory access rates, representing percentage of memory access, for respective tasks on basis of hardware monitor information obtained by monitoring operating states of hardware during execution of an application program, the tasks corresponding to respective syntax units specified in the application program;
    assigning, on basis of the calculated memory access rates, a first task to a first socket among sockets in a processor in response to an instruction for executing the first task,
        the first socket selected on basis of a first memory access rate calculated for the first task and second memory access rates calculated for second tasks already assigned to the first socket, and
        the first task assigned to the selected first socket when a total of the first memory access rate and the second memory access rates is less than a predetermined value; and
    continuing the monitoring of the operating states of the hardware during execution of the application program after said assigning.

2. A non-transitory computer-readable recording medium having stored therein a task assignment program for causing a computer to execute a process, the process comprising:
    calculating memory access rates, representing percentage of memory access, for respective tasks on basis of hardware monitor information obtained by monitoring operating states of hardware during execution of an application program, the tasks corresponding to respective syntax units specified in the application program;
    assigning, on basis of the calculated memory access rates, a first task to a first socket among sockets in a processor in response to an instruction for executing the first task,
        the first socket selected on basis of a first memory access rate calculated for the first task and second memory access rates calculated for second tasks already assigned to the first socket, and
        the first task assigned to the selected first socket when a total of the first memory access rate and the second memory access rates is less than a predetermined value; and
    continuing the monitoring of the operating states of the hardware during execution of the application program after said assigning.

3. The non-transitory computer-readable recording medium according to claim 2, wherein a memory access rate for a specific task is calculated using an elapsed time and one of memory access latency and cache miss information included in the hardware monitor information, the elapsed time being a time elapsed for executing the specific task, the memory access latency being a time for waiting completion of an access to a memory, the cache miss information indicating that a case is occurred where data does not exist when a processor searches a cache memory.

4. The non-transitory computer-readable recording medium according to claim 2, wherein the first task is assigned to a second socket among the sockets depending on whether the first task has a parent-child relationship with any task to be assigned.

5. The non-transitory computer-readable recording medium according to claim 4, wherein
    the first task is assigned, if the first task has a parent-child relationship with a second task to be assigned, to the second socket to which the second task is assigned, and
    the first task is assigned, if the first task has a parent-child relationship with no task to be assigned, such that totals of memory access rates for tasks assigned to respective sockets among the sockets are made substantially uniform.

6. The non-transitory computer-readable recording medium according to claim 2, the process further comprising updating said assigning based on the monitoring of the operating states of the hardware after said assigning.

7. An information processing device, comprising: a processor configured to
    calculate memory access rates, representing percentage of memory access, for respective tasks on basis of hardware monitor information obtained by monitoring operating states of hardware during execution of an application program, the tasks corresponding to respective syntax units specified in the application program; and
    assign, on basis of the calculated memory access rates, a first task to a first socket among sockets in the processor in response to an instruction for executing the first task,
        the first socket selected on basis of a first memory access rate calculated for the first task and second memory access rates calculated for second tasks already assigned to the first socket, and
        the first task assigned to the selected first socket when a total of the first memory access rate and the second memory access rates is less than a predetermined value; and
    continue to monitor the operating states of the hardware during execution of the application program, including the first task, after the first task is assigned.

* * * * *

UNITED STATES PATENT AND TRADEMARK OFFICE
CERTIFICATE OF CORRECTION

PATENT NO. : 9,733,982 B2
APPLICATION NO. : 14/520557
DATED : August 15, 2017
INVENTOR(S) : Yasuyuki Ohno et al.

Page 1 of 1

It is certified that error appears in the above-identified patent and that said Letters Patent is hereby corrected as shown below:

On the Title Page

Item [56] (References Cited), Page 2 (Other Publications), Line 24:
Delete "dated Jun. 6, 2017." and insert -- dated Jun. 13, 2017. --, therefore.

Signed and Sealed this
Thirtieth Day of January, 2018

Joseph Matal
*Performing the Functions and Duties of the
Under Secretary of Commerce for Intellectual Property and
Director of the United States Patent and Trademark Office*